(12) United States Patent
Murata et al.

(10) Patent No.: US 9,834,200 B2
(45) Date of Patent: Dec. 5, 2017

(54) VEHICLE AND METHOD OF CONTROLLING VEHICLE

(71) Applicant: TOYOTA JIDOSHA KABUSHIKI KAISHA, Toyota-shi, Aichi-ken (JP)

(72) Inventors: Takashi Murata, Kasugai (JP); Shingo Kato, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/114,577

(22) PCT Filed: Jan. 21, 2015

(86) PCT No.: PCT/IB2015/000050
§ 371 (c)(1),
(2) Date: Jul. 27, 2016

(87) PCT Pub. No.: WO2015/114434
PCT Pub. Date: Aug. 6, 2015

(65) Prior Publication Data
US 2016/0347303 A1 Dec. 1, 2016

(30) Foreign Application Priority Data
Jan. 31, 2014 (JP) .................................. 2014-018068

(51) Int. Cl.
*B60K 11/08* (2006.01)
*B60K 6/445* (2007.10)
(Continued)

(52) U.S. Cl.
CPC .............. *B60W 20/15* (2016.01); *B60K 6/445* (2013.01); *B60K 11/085* (2013.01); *B60W 10/06* (2013.01);
(Continued)

(58) Field of Classification Search
CPC ...... B60W 20/15; B60W 20/13; B60W 10/06; B60W 10/08; B60W 20/00;
(Continued)

(56) References Cited

U.S. PATENT DOCUMENTS

2010/0250039 A1 9/2010 Bryan et al.
2010/0282533 A1 11/2010 Sugiyama
(Continued)

FOREIGN PATENT DOCUMENTS

EP 2 172 357 A2 4/2010
EP 2172357 A2 * 4/2010 ........... B60K 11/085
(Continued)

*Primary Examiner* — Marthe Marc-Coleman
(74) *Attorney, Agent, or Firm* — Finnegan, Henderson, Farabow, Garrett & Dunner, LLP

(57) ABSTRACT

A vehicle has an engine (26), a power storage device (10), two motor/generators (M/G1, M/G2), a front grille with a shutter, an engine room, a first temperature sensor, a second temperature sensor, and a controller. The shutter changes the amount of air introduced from the front grille into the engine room. The first temperature sensor detects a temperature (Tw) of a coolant of the engine, and outputs the detected coolant temperature to the controller. The second temperature sensor detects an outside air temperature (Te), and outpots the detected outside air temperature to the controller. The controller starts the engine (26) when the coolant temperature is equal to or lower than a threshold value. When the coolant temperature is higher than the threshold value, and the vehicle starts traveling in a first mode with power from the power storage device (10), the controller drives the shutter such that the amount of the air is reduced when the coolant temperature (Tw) is higher than the outside air temperature (Te).

8 Claims, 9 Drawing Sheets

(51) Int. Cl.
- *B60W 10/06* (2006.01)
- *B60W 10/08* (2006.01)
- *B60W 10/26* (2006.01)
- *B60W 20/15* (2016.01)
- *B60W 20/00* (2016.01)
- *B60W 20/13* (2016.01)

(52) U.S. Cl.
CPC ............ *B60W 10/08* (2013.01); *B60W 10/26* (2013.01); *B60W 20/00* (2013.01); *B60W 20/13* (2016.01); *B60W 2510/0676* (2013.01); *B60W 2510/244* (2013.01); *B60W 2510/246* (2013.01); *B60W 2550/12* (2013.01); *Y02T 10/6239* (2013.01); *Y02T 10/6269* (2013.01); *Y02T 10/6286* (2013.01); *Y02T 10/88* (2013.01)

(58) Field of Classification Search
CPC ... B60W 2510/0676; B60W 2510/244; B60W 2510/246; B60W 2550/12; B60K 6/445; B60K 11/085; Y02T 10/6239; Y02T 10/6269; Y02T 10/6286

USPC ............ 701/22; 180/65.265, 65.28; 903/930; 123/41.04, 41.05, 41.01; 236/49.1
See application file for complete search history.

(56) References Cited

U.S. PATENT DOCUMENTS

| | | |
|---|---|---|
| 2011/0118931 A1 | 5/2011 | Kawato |
| 2011/0118945 A1 | 5/2011 | Mochizukii |
| 2011/0288717 A1* | 11/2011 | Yu ........................ B60K 11/085 701/31.4 |
| 2012/0022742 A1 | 1/2012 | Nemoto |
| 2013/0030635 A1 | 1/2013 | Morita |

FOREIGN PATENT DOCUMENTS

| | | |
|---|---|---|
| EP | 2 233 341 A1 | 9/2010 |
| JP | 3211650 | 7/2001 |
| JP | 2008-126970 | 6/2008 |
| JP | 2010-69923 | 4/2010 |
| JP | 2010-247819 | 11/2010 |
| JP | 2010-260440 | 11/2010 |
| JP | 2011-105219 | 6/2011 |
| JP | 2011-105221 | 6/2011 |
| JP | 5005073 | 6/2012 |

\* cited by examiner

VEHICLE AND METHOD OF CONTROLLING VEHICLE

BACKGROUND OF THE INVENTION

CROSS-REFERENCE TO RELATED APPLICATIONS

This application is a national phase application of International Application No. PCT/IB2015/000050, filed Jan. 21, 2015, and claims the priority of Japanese Application No. 2014-018068, filed Jan. 31, 2014, the content of both of which is incorporated herein by reference.

1. Field of the Invention

The invention relates to a vehicle capable of traveling using output of a power storage device, and a method of controlling the vehicle.

2. Description of Related Art

A vehicle (so-called hybrid vehicle) on which an engine and a battery assembly are installed is able to run using output of the battery assembly, without starting the engine. This type of traveling is called EV (Electric Vehicle) traveling. In the hybrid vehicle, when the temperature of a coolant of the engine is equal to or lower than a threshold value, the engine is started. Therefore, even when the EV traveling is requested by the user, the engine is started when the vehicle starts traveling, if the temperature of the coolant is equal to or lower than the threshold value under the influence of the outside air temperature.

According to a technology as described in Japanese Patent Application Publication No. 2008-126970 (JP 2008-126970 A), when a battery installed on a vehicle is charged with electric power supplied from a household power supply, electric power is supplied from the household power supply to a block heater. Then, the block heater generates heat, so as to heat the coolant of the engine. By using this technology, it is possible to raise the temperature of the coolant so that it becomes higher than the threshold value when the vehicle starts traveling. It is thus possible to travel the vehicle in the EV traveling mode, without starting the engine, when the vehicle starts traveling.

SUMMARY OF THE INVENTION

When only the household power supply is used as the power supply of the block heater, the block heater cannot generate heat during traveling of the vehicle. Accordingly, even if the engine coolant is heated by use of the block heater before the vehicle starts traveling, the temperature of the coolant is likely to be reduced during traveling of the vehicle. More specifically, the air or wind that blows against the traveling vehicle passes through a front grille and is directed to the engine, etc., whereby the temperature of the coolant is likely to be reduced.

In the above situation, the temperature of the coolant may become equal to or lower than the threshold value, and the engine may be started while the vehicle is traveling in the EV mode. Whether the vehicle can travel in the EV mode or not depends on the SOC (State of Charge) of the battery assembly. If the engine is started due to reduction of the coolant temperature even though the vehicle can continue to travel in the EV mode according to the SOC of the battery assembly, the vehicle will not be able to continue to travel in the EV mode.

According to one aspect of the invention, a vehicle includes an engine, a power storage device, a front grille, an engine room, a shutter, a first temperature sensor, a second temperature sensor, and a controller that controls driving of the shutter. The engine is a first power source of the vehicle. The power storage device is a second power source of the vehicle, and is adapted to be charged and discharged. The engine is housed in the engine room. The shutter is configured to change an amount of air introduced from a front grille into the engine room. The first temperature sensor is configured to detect a first temperature, and output the detected first temperature to the controller. The first temperature is a temperature of a coolant of the engine. The second temperature sensor is configured to detect a second temperature, and output the detected second temperature to the controller. The second temperature is a temperature of outside air.

The controller is configured to travel the vehicle in a selected one of a first mode and a second mode. The first mode is a mode in which the vehicle travels using the power storage device when a state of charge of the power storage device is higher than a reference value. The second mode is a mode in which the vehicle travels using the engine and the power storage device when the SOC is equal to or lower than the reference value, such that the state of charge of the power storage device is varied within a predetermined range that is equal to or lower than the reference value.

The relationship of the first mode and the second mode includes at least one of "the case where the first mode is a CD (Charge Depleting) mode, and the second mode is a CS (Charge Sustaining) mode", and "the case where the first mode is an EV (Electric Vehicle) mode, and the second mode is a HV (Hybrid Vehicle) mode".

In the CD mode, the vehicle travels while reducing the SOC. In the CS mode, the vehicle travels while keeping the state of charge within the predetermined range. Although the state of charge is normally reduced in the CD mode, the state of charge may be increased when the power storage device is charged with regenerative electric power generated during braking of the vehicle.

The power storage device may be charged with electric power from a power supply installed outside the vehicle. The CD mode is set in a period in which the SOC is reduced from a level reached when the charging is completed, to a reference value. The CS mode is set when the SOC is equal to or lower than the reference value. When the SOC is kept reduced as the vehicle is traveling, the CS mode is set following the CD mode.

If the output required to be produced by the vehicle, through an operation of an accelerator pedal, for example, becomes equal to or greater than the required output (which may also be called "engine startup output") for starting the engine while the vehicle is traveling in a condition where the engine is stopped, the engine is started. The engine startup output in the CD mode is larger than the engine startup output in the CS mode.

In the vehicle as described above, the controller is configured to start the engine when the first temperature is equal to or lower than a threshold value. When the first temperature is higher than the threshold value, the vehicle starts traveling in the first mode, and the first temperature is higher than the second temperature, the controller is configured to drive the shutter such that the amount of the air is reduced.

When the vehicle starts traveling after being left standing, the temperature of the coolant is normally equal to the temperature of the outside air. If the coolant is heated by a heater before the vehicle starts traveling, the temperature of the coolant is higher than the temperature of the outside air. When the temperature of the coolant is higher than the threshold value, the vehicle can start traveling in the first mode, without starting the engine.

Since the outside air temperature is lower than the coolant temperature, the coolant temperature is likely to be reduced if the air (outside air) is introduced into the engine room while the vehicle is traveling in the first mode. Thus, the shutter is driven so as to reduce the amount of the air introduced into the engine room, so that the coolant temperature is less likely to be reduced by the air (or wind) introduced into the engine room during traveling in the first mode. Then, during traveling in the first mode, the coolant temperature is less likely to be equal to or lower than the threshold value, and the engine is less likely to be started. Namely, the vehicle can continue to travel in the first mode, while curbing or preventing starting of the engine due to reduction of the coolant temperature.

The vehicle according to the above aspect of the invention may further include a third temperature sensor. The third temperature sensor is configured to detect a third temperature, and output the third temperature to the controller. The third temperature is a temperature of the power storage device. When the temperature of the power storage device is lower than a lower-limit temperature and the temperature of the power storage device is higher than an upper-limit temperature, an upper-limit electric power value up to which discharge of the power storage device is permitted is reduced to be lower than a reference electric power value. When the temperature of the power storage device is equal to or higher than the low-limit temperature and is equal to or lower than the upper-limit temperature, the upper-limit electric power value is equal to the reference electric power value.

In the vehicle as described above, the controller may be configured to drive the shutter such that the amount of the air is reduced, when the temperature of the power storage device is equal to or higher than the lower-limit temperature and is equal to or lower than the upper-limit temperature, and the coolant temperature is higher than the outside air temperature. In this condition, since the upper-limit electric power value is not reduced to be lower than the reference electric power value, the required output of the vehicle can be provided or covered by the discharged power (output) of the power storage device, and the vehicle is easily kept traveling in the first mode. In order to maintain this condition, it is preferable to drive the shutter as described above, and curb reduction of the coolant temperature.

If, on the other hand, the upper-limit electric power value is reduced to be lower than the reference power value, the required output of the vehicle is less likely to be covered by the discharged power (output) of the power storage device. Therefore, the engine may be started. If the engine is started, it is not necessary to drive the shutter as described above, and curb reduction of the coolant temperature.

In the vehicle as described above, the controller may be configured to drive the shutter such that the amount of the air is reduced to an amount that is lower than the amount of the air introduced when the first temperature is higher than the threshold value.

In the vehicle as described above, the controller may be configured to drive the shutter such that the amount of the air is reduced to an amount that is lower than the amount of the air introduced when the vehicle travels in the second mode.

In the vehicle as described above, the controller may be configured to drive the shutter such that the amount of the air is reduced to an amount that is lower than the amount of the air introduced when the first temperature is equal to or lower than the second temperature.

According to another aspect of the invention, a vehicle includes a plurality of power sources, a front grille, an engine room, a shutter, a first temperature sensor, a second temperature sensor, and a controller. The power sources include an engine and a power storage device. The engine is housed in the engine room. The shutter is configured to change an amount of air introduced from the front grille into the engine room. The first temperature sensor is configured to detect a first temperature. The first temperature is a temperature of a coolant of the engine. The second temperature sensor is configured to detect a second temperature. The second temperature is a temperature of outside air. The controller is configured to start the engine when the first temperature is equal to or lower than a threshold value. The controller is configured to drive the shutter when the first temperature is higher than the threshold value and the vehicle travels with power of the power storage device, such that the amount of the air introduced when the first temperature is higher than the second temperature is reduced to be lower than the amount of the air introduced when the first temperature is equal to or lower than the second temperature.

According to a further aspect of the invention, a method of controlling a vehicle including a plurality of power sources, a front grille, an engine room, a shutter, a first temperature sensor, a second temperature sensor, and a controller is provided. The power sources include an engine and a power storage device. The engine is housed in the engine room. The shutter is configured to change an amount of air introduced from the front grille into the engine room. The first temperature sensor is configured to detect a first temperature. The first temperature is a temperature of a coolant of the engine. The second temperature sensor is configured to detect a second temperature. The second temperature is a temperature of outside air. The control method includes the steps of: (a) starting the engine, by the controller, when the first temperature is equal to or lower than a threshold value, and (b) driving the shutter, by the controller, when the first temperature is higher than the threshold value and the vehicle travels with power of the power storage device, such that the amount of the air introduced when the first temperature is higher than the second temperature is reduced to be lower than the amount of the air introduced when the first temperature is equal to or lower than the second temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of the invention will be described.

Figure 1:
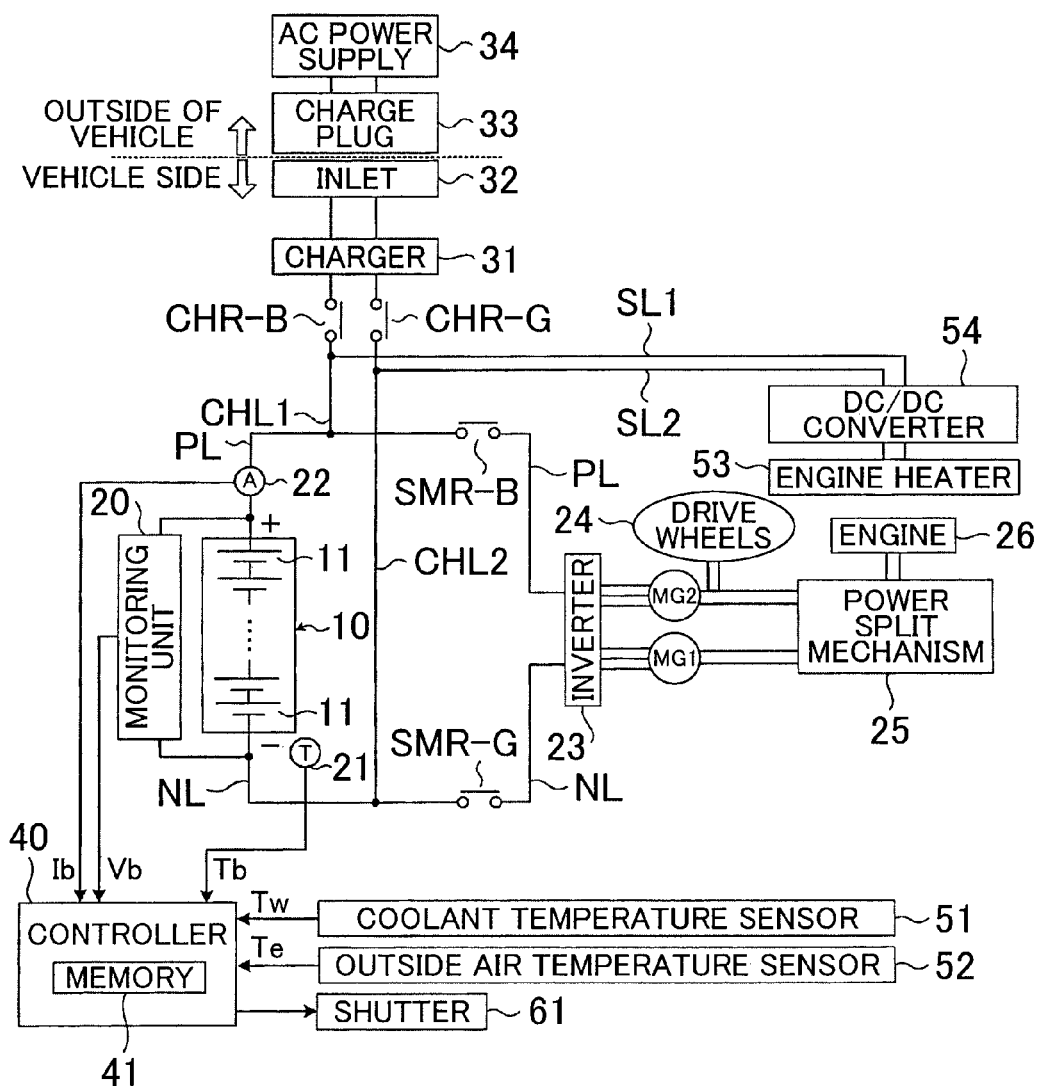
FIG. 1 is a view showing the configuration of a battery system.

FIG. 1 shows the configuration of a battery system according to a first embodiment of the invention. The battery system shown in FIG. 1 is installed on a vehicle (so-called hybrid vehicle). This vehicle includes a battery assembly (corresponding to the power storage device of the invention) and an engine, as power sources for traveling the vehicle, as will be described later.

The battery assembly 10 has a plurality of unit cells 11 connected in series. As each of the unit cells 11, a secondary cell, such as a nickel-metal-hydride cell or a lithium-ion cell, may be used. Also, an electric double layer capacitor may be used in place of the secondary cell. While all of the unit cells 11 are connected in series in the battery assembly 10 of this embodiment, the battery assembly 10 may include two or more unit cells 11 connected in parallel.

A monitoring unit 20 detects a voltage value Vb of the battery assembly 10, and outputs the detection result to a controller 40. The monitoring unit 20 may detect a voltage value of each of the unit cells 11. A battery temperature sensor (corresponding to the third temperature sensor of the invention) 21 detects the temperature (battery temperature) Tb of the battery assembly 10, and outputs the detection result to the controller 40. A current sensor 22 detects a current value Ib of the battery assembly 10, and outputs the detection result to the controller 40. In this embodiment, a positive value is used as a current value Ib when the battery assembly 10 is discharged, and a negative value is used as a current value Ib when the battery assembly 10 is charged.

A positive line PL is connected to a positive terminal of the battery assembly 10, and a negative line NL is connected to a negative terminal of the battery assembly 10. The battery assembly 10 is connected to an inverter 23, via the positive line PL and the negative line NL. A system main relay SMR-B is provided in the positive line PL, and a system main relay SMR-G is provided in the negative line NL.

Each of the system main relays SMR-B, SMR-G is switched between ON and OFF, in response to a drive signal from the controller 40. The controller 40 receives a command indicative of turn-on of the ignition switch, and switches the system main relays SMR-B, SMR-G from OFF to ON, in response to the command. In this manner, the battery assembly 10 and the inverter 23 can be connected to each other, and the battery system shown in FIG. 1 is placed in a startup status (Ready-On). When the battery system is in the startup status, it is able to travel the vehicle, as will be explained below.

The inverter 23 converts DC power generated from the battery assembly 10 into AC power, and delivers the AC power to a motor-generator MG2. The motor-generator MG2 receives the AC power from the inverter 23, and produces power (kinetic energy) using the AC power. The power produced by the motor-generator MG2 is transmitted to drive wheels 24, so as to travel the vehicle.

Also, the motor-generator MG2 converts kinetic energy generated during braking of the vehicle into AC power, and delivers the AC power to the inverter 23. The inverter 23 converts the AC power from the motor-generator MG2, into DC power, and delivers the DC power to the battery assembly 10. In this manner, the battery assembly 10 is able to store regenerative power.

A power split mechanism 25 transmits the power of the engine 26 to the drive wheels 24, or transmits it to a motor-generator MG1. The motor-generator MG1 receives the power of the engine 26 and generates electric power (AC power). The AC power produced by the motor-generator MG1 is supplied to the motor-generator MG2 or supplied to the battery assembly 10, via the inverter 23. If the electric power produced by the motor-generator MG1 is supplied to the motor-generator MG2, the motor-generator MG2 produces power that can be used for driving the drive wheels 24. If the electric power produced by the motor-generator MG1 is supplied to the battery assembly 10, the battery assembly 10 can be charged with the electric power.

A booster circuit (not shown) may be provided in a current channel between the battery assembly 10 and the inverter 23. The booster circuit boosts or raises the output voltage of the battery assembly 10, and delivers electric power having the raised voltage to the inverter 23. Also, the booster circuit can lower the output voltage of the inverter 23, and deliver electric power having the lowered voltage to the battery assembly 10.

A charge line CHL1 is connected to the positive line PL between the positive terminal of the battery assembly 10 and the system main relay SMR-B. A charge line CHL2 is connected to the negative line NL between the negative terminal of the battery assembly 10 and the system main relay SMR-G The charge lines CHL1, CHL2 are connected to a charger 31.

A charge relay CHR-B is provided in the charge line CHL1 that connects the charger 31 and the positive line PL. A charge relay CHR-G is provided in the charge line CHL2 that connects the charger 31 and the negative line NL. Each of the charge relays CHR-B, CHR-G is switched between ON and OFF, in response to a drive signal from the controller 40.

An inlet (i.e., a connector) 32 is connected to the charger 31, via the charge lines CHL1, CHL2. A charge plug (i.e., a connector) 33 is connected to the inlet 32. Namely, the charge plug 33 can be connected to the inlet 32 or disconnected from the inlet 32. The charge plug 33 is connected to an AC power supply 34 via a cable. The charge plug 33 and the AC power supply 34 are installed outside the vehicle, separately from the vehicle. For example, a commercial power supply is used as the AC power supply 34.

When the charge plug 33 is connected to the inlet 32, and the charge relays CHR-B, CHR-G are switched ON, electric power can be supplied from the AC power supply 34 to the battery assembly 10, so as to charge the battery assembly 10. This type of charging will be called "external charging". The charger 31 converts AC power supplied from the AC power supply 34 into DC power, and delivers the DC power to the battery assembly 10. Also, the charger 31 can raise the output voltage of the AC power supply 34, and deliver the power having the raised voltage to the battery assembly 10. The operation of the charger 31 is controlled by the controller 40.

The system that performs external charging is not limited to the one shown in FIG. 1. Namely, any system that can charge the battery assembly 10, using a power supply (external power supply) installed outside the vehicle, may be used. For example, a DC power supply may be used as the external power supply, in addition to or in place of the AC power supply 34. Also, a system (so-called non-contact charging system) that supplies electric power without using a cable may be used. The non-contact charging system may employ a known arrangement or configuration as appropriate.

In the meantime, the charge line CHL1 may be connected to the positive line PL between the system main relay SMR-B and the inverter 23. Also, the charge line CHL2 may be connected to the negative line NL between the system main relay SMR-G and the inverter 23. In this case, when external charging is conducted, the charge relays CHR-B, CHR-G and the system main relays SMR-B, SMR-G are switched ON.

The controller 40 has a memory 41. The memory 41 stores certain information. While the memory 41 is incorporated in the controller 40, the memory 41 may be provided outside the controller 40. A coolant temperature sensor (corresponding to the first temperature sensor of the invention) 51 detects the temperature Tw of the coolant of the engine 26, and delivers the detection result to the controller 40. The coolant of the engine 26 is used for cooling the engine 26. An outside air temperature sensor (corresponding to the second temperature sensor of the invention) 52 detects the temperature Te of the outside air, and delivers the detection result to the controller 40.

An engine heater 53 is used for heating the engine 26, and heat generated from the engine heater 53 is transferred to the engine 26. The engine 26 may be heated by heating the coolant of the engine 26, or heating the engine oil. With the engine 26 thus heated, the temperature Tw of the coolant is raised.

The engine heater 53 is only required to heat the engine 26, and may employ any known structure or arrangement as appropriate. For example, a device or element that generates heat when energized may be used as the engine heater 53. An external power supply (such as the AC power supply 34) is used as a power supply of the engine heater 53. Namely, when external charging is conducted, electric power is supplied from the external power supply to the engine heater 53, so as to heat the engine 26.

Power supply lines SL1, SL2 are respectively connected to the charge lines CHL1, CHL2. More specifically, the power supply line SL1 is connected to the charge line CHL1 that connects the charge relay CKR-B and the positive line PL. Also, the power supply line SL2 is connected to the charge line CHL2 that connects the charge relay CHR-G and the negative line NL.

A DC/DC converter 54 is connected to the power supply lines SL1, SL2. When the charge relays CHR-B, CHR-G are ON, electric power can be supplied from the charger 31 to the DC/DC converter 54. The engine heater 53 is connected to the DC/DC converter 54, via the power supply lines SL1, SL2. The electric power whose voltage has been converted by the DC/DC converter 54 is supplied to the engine heater 53. The controller 40 controls the operation of the DC/DC converter 54.

In this embodiment, when external charging is conducted, the engine heater 53 is driven to heat the engine 26 (or the coolant). However, the invention is not limited to this arrangement. Namely, even when external charging is not conducted, the engine 26 can be heated. For example, a known block heater may be connected to an external power supply (such as the AC power supply 34), so that the block heater can generate heat for heating the engine 26. Thus, even if the engine heater 53 is not installed in advance on the vehicle, the engine 26 may be heated, using a heater connected to the external power supply.

Figure 2:
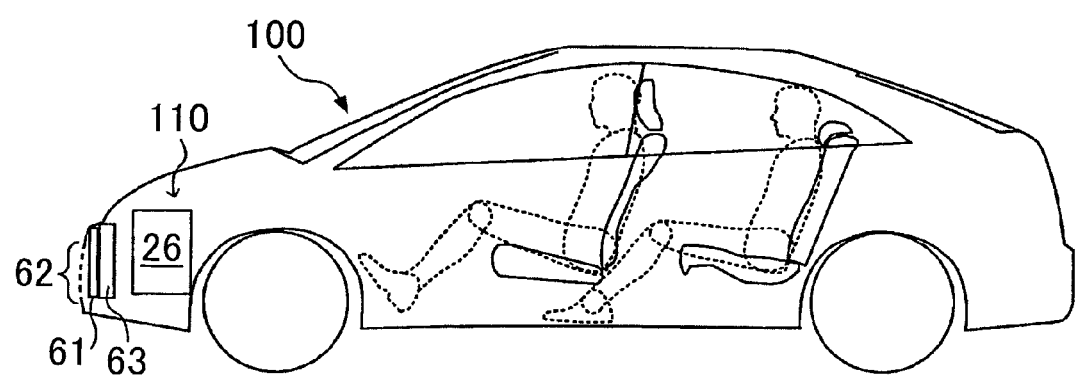
FIG. 2 is a view illustrating a location at which a shutter is disposed.

A shutter 61 operates in response to a drive signal from the controller 40. More specifically, the shutter 61 is operable between a closed state and an open state. As shown in FIG. 2, a front grille 62 is provided at the front of the vehicle 100. The front grille 62 is used for drawing air from the front of the vehicle 100 into an engine room 110. The engine 26 and a radiator 63 are housed in the engine room 110, and the shutter 61 is disposed between the radiator 63 and the front grille 62. The coolant of the engine 26 flows through the radiator 63.

Figure 3:
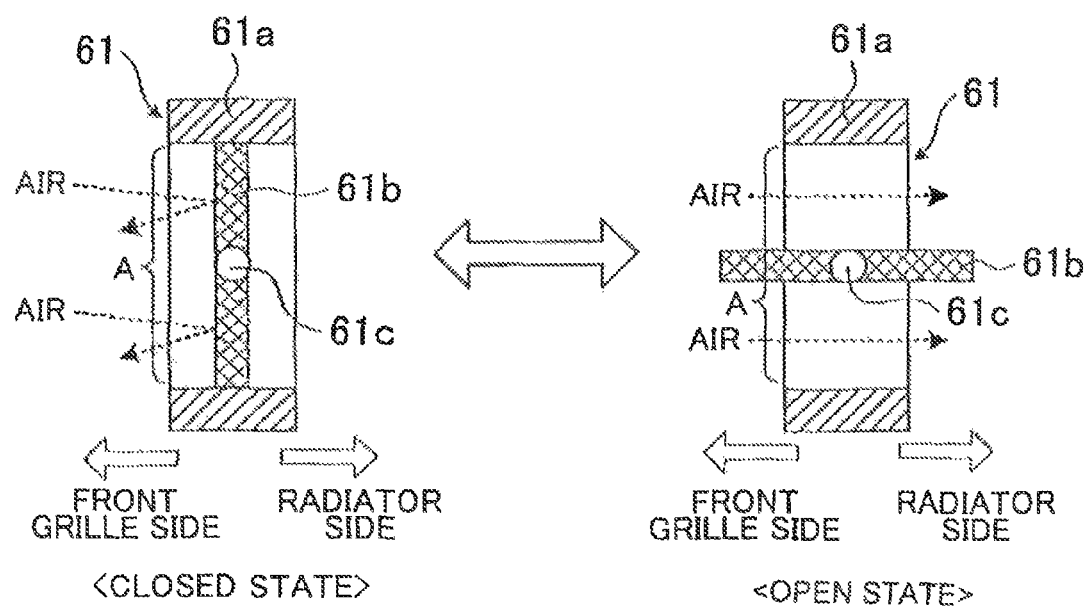
FIG. 3 is a schematic view showing the structure of the shutter.

FIG. 3 is a schematic view showing the structure of the shutter 61. The shutter 61 has a frame body 61a, a closure plate 61b, and a rotary shaft 61c. The rotary shaft 61c is coupled to a motor, and rotates when receiving power from the motor. The motor is driven by the controller 40. As a power supply of the motor, an auxiliary battery installed on the vehicle 100 may be used. The closure plate 61b is fixed to the rotary shaft 61c, so that the closure plate 61b rotates in accordance with rotation of the rotary shaft 61c.

As shown in FIG. 3, when the shutter 61 is placed in the closed state, the closure plate 61b blocks an opening A formed by the frame body 61a. With the shutter 61 thus closed, during traveling of the vehicle 100, air that has passed through the front grille 62 is inhibited by the closure plate 61b from moving into the engine room 110 (the radiator and the engine 26).

On the other hand, when the shutter 61 is placed in the open state, the closure plate 61b does not block the opening A. With the shutter 61 thus opened, during traveling of the vehicle 100, air that has passed through the front grille 62 passes through the shutter 61, and is introduced into the engine room 110 (the radiator 63 and the engine 26). It is thus possible to change the amount of the air introduced from the front grille 62 into the engine room 110, by switching the shutter 61 between the closed state and the open state.

In the vehicle 100 of this embodiment, a CD (Charge Depleting) mode and a CS (Charge Sustaining) mode are set as traveling modes. In the CD mode (corresponding to the first mode of the invention), the vehicle 100 preferentially travels using only the output of the battery assembly 10, in other words, travels using only the power of the motor-generator MG2. When the SOC (State of Charge) of the battery assembly 10 is higher than a reference value SOC_ref, the vehicle 100 can travel in the CD mode. The SOC is the proportion of the current charging capacity to the full charging capacity.

Figure 4:
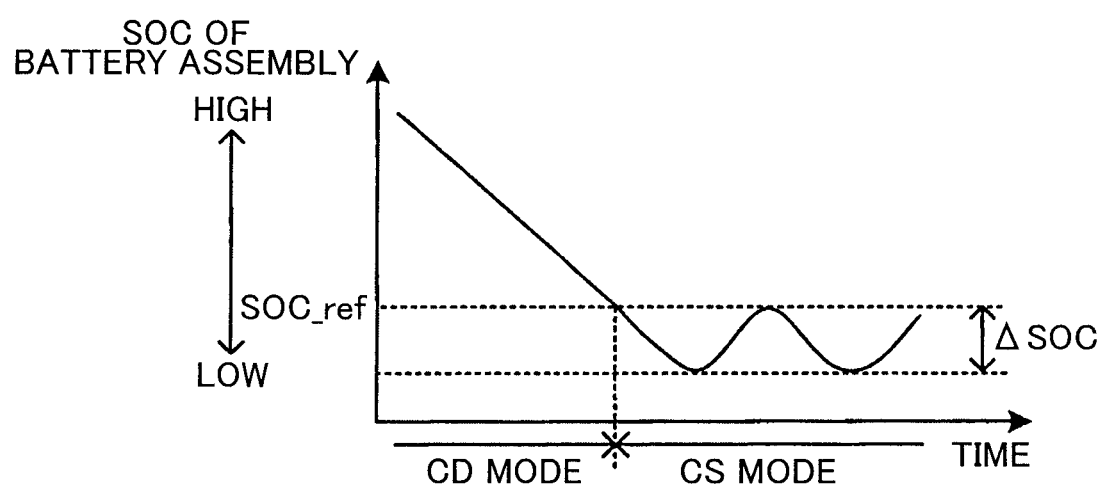
FIG. 4 is a view useful for explaining a CD mode and a CS mode.

In the CS mode (corresponding to the second mode of the invention), the vehicle 100 preferentially travels using both the battery assembly 10 and the engine 26. When the SOC of the battery assembly 10 is equal to or lower than the reference value SOC_ref, the vehicle 100 can travel in the CS mode. The controller 40 may set the CD mode and the CS mode. FIG. 4 shows one example of the behavior of the SOC of the battery assembly 10 in the CD mode and the CS mode. In FIG. 4, the vertical axis indicates the SOC of the battery assembly 10, and the horizontal axis indicates time.

When the SOC of the battery assembly 10 is higher than the reference value SOC_ref, the controller 40 sets the CD mode. When the SOC of the battery assembly 10 is equal to or lower than the reference value SOC_ref, on the other hand, the controller 40 sets the CS mode. Accordingly, when the SOC of the battery assembly 10 is higher than the reference value SOC_ref, the vehicle 100 is kept traveling in the CD mode. During traveling in the CD mode, the SOC of the battery assembly 10 is reduced according to traveling of the vehicle 100. However, during braking of the vehicle 100, the battery assembly 10 is charged as described above, and the SOC of the battery assembly 10 is increased.

When the SOC of the battery assembly 10 reaches the reference value SOC_ref, the traveling mode of the vehicle 100 switches from the CD mode to the CS mode. In the CS mode, both the battery assembly 10 and the engine 26 are used, and therefore, the SOC of the battery assembly 10 is less likely to be reduced. More specifically, charge and discharge of the battery assembly 10 are controlled, so that the SOC of the battery assembly 10 varies within a predetermined range $\Delta$SOC that is equal to or lower than the reference value SOC_ref. The predetermined range $\Delta$SOC is specified by the upper-limit SOC and the lower-limit SOC, and the upper-limit SOC may be made equal to the reference value SOC_ref, as shown in FIG. 4.

When the SOC of the battery assembly 10 reaches the upper-limit SOC, the battery assembly 10 is positively discharged, so that the SOC of the battery assembly 10 is reduced. When the SOC of the battery assembly 10 reaches the lower-limit SOC, the battery assembly 10 is positively charged, so that the SOC of the battery assembly 10 is increased. When the SOC of the battery assembly 10 is increased, regenerative electric power, or electric power generated by the motor-generator MG1 by use of the power of the engine 26 is used. In this manner, the SOC of the battery assembly 10 can be varied within the predetermined range $\Delta$SOC.

In the CD mode and the CS mode, the vehicle 100 may be placed in a condition where it travels using only the power of the motor-generator MG2 (the output of the battery assembly 10), and a condition where it travels using the power of the engine 26 and the power of the motor-generator MG2 (the output of the battery assembly 10). Here, the required output for starting the engine 26 (which will be called "engine startup output") differs between the CD mode and the CS mode. More specifically, the engine startup output in the CD mode is larger than the engine startup output in the CS mode. The engine startup outputs in the CD mode and the CS mode may be set in advance. The engine startup output is specified by the rotational speed and torque of the engine 26.

When the output required to be produced by the vehicle 100 due to operation of an accelerator pedal, for example, is lower than the engine startup output in the CD mode, the vehicle 100 travels (in the CD mode) using only the power of the motor-generator MG2 while the engine 26 is being stopped. When the output required to be produced by the vehicle 100 is equal to or higher than the engine startup output, on the other hand, the vehicle 100 travels (in the CD mode) using the power of the engine 26 and the motor-generator MG2.

The output required of the vehicle 100 is equal to or higher than the engine startup output in the CD mode, in a limited traveling condition, such as WOT (Wide Open Throttle). Therefore, in the CD mode, the vehicle 100 preferentially travels using only the power of the motor-generator MG2.

When the output required of the vehicle 100 is lower than the engine startup output in the CS mode, the vehicle 100 travels (in the CS mode) using only the power of the motor-generator MG2 while the engine 26 is being stopped. When the output required of the vehicle 100 is equal to or higher than the engine startup output in the CS mode, on the other hand, the vehicle 100 travels (in the CS mode) using the power of the engine 26 and the motor-generator MG2.

The output required of the vehicle 100 is lower than the engine startup output in the CS mode, only in a limited driving condition, such as idling. Therefore, in the CS mode, the vehicle 100 preferentially travels using the power of the engine 26 and the motor-generator MG2.

Figure 5:
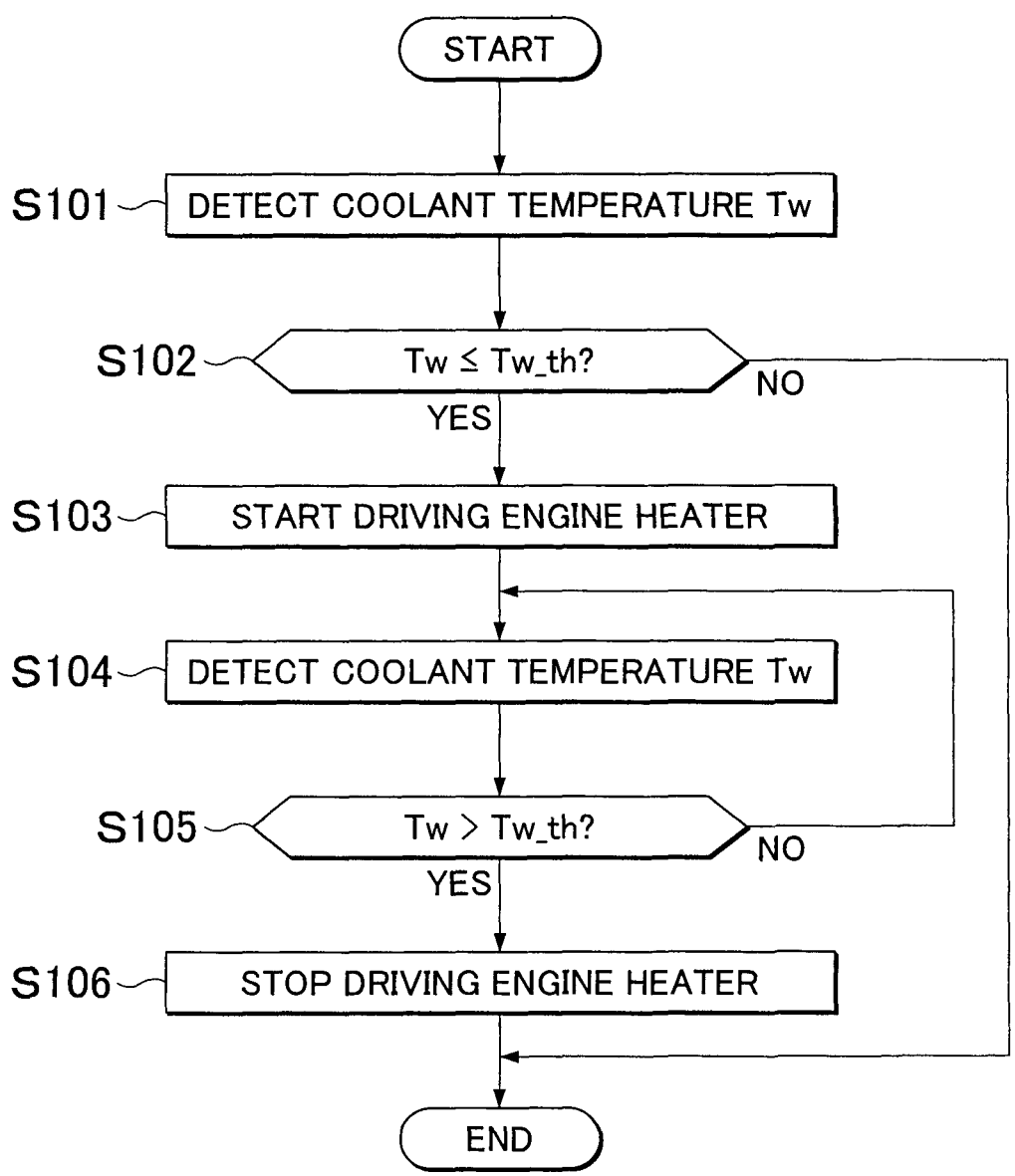
FIG. 5 is a flowchart illustrating drive control of an engine heater.

Next, a process performed when the engine heater 53 is driven will be described using the flowchart shown in FIG. 5. The process shown in FIG. 5 is carried out by the controller 40. When the process shown in FIG. 5 is started, the charge plug 33 is connected to the inlet 32, and the charge relays CHR-B, CHR-G are switched ON. Thus, the process shown in FIG. 5 is performed before the vehicle 100 starts traveling.

In step S101, the controller 40 obtains the temperature Tw of the coolant, based on the output (detection result) of the coolant temperature sensor 51. At this time, the temperature Tw of the coolant is influenced by the outside air temperature Te. For example, the temperature Tw of the coolant becomes closer to or equal to the outside air temperature, as a period of time for which the vehicle 100 is left standing without being driven becomes longer.

In step S102, the controller 40 determines whether the coolant temperature Tw obtained in step S101 is equal to or lower than a threshold value Tw_th. The threshold value Tw_th is a temperature (coolant temperature Tw) based on which it is determined whether the engine 26 is to be started. Namely, when the coolant temperature Tw is equal to or lower than the threshold value Tw_th, the engine 26 is started. The threshold value Tw_th may be set in advance, and information that specifies the threshold value Tw_th may be stored in the memory 41.

When the coolant temperature Tw is higher than the threshold value Tw_th, the controller 40 finishes the process shown in FIG. 5. When the coolant temperature Tw is equal to or lower than the threshold value Tw_th, on the other hand, the controller 40 starts driving the engine heater 53 in step S103. In this step, electric power is supplied from the AC power supply 34 to the engine heater 53. By driving the engine heater 53, it is possible to heat the engine 26 and raise the coolant temperature Tw.

In step S104, the controller 40 obtains the coolant temperature Tw, based on the output of the coolant temperature sensor 51. In step S105, the controller 40 determines whether the coolant temperature Tw obtained in step S104 is higher than the threshold value Tw_th. If the coolant temperature Tw is equal to or lower than the threshold value Tw_th, the controller 40 returns to step S104. In this case, the engine heater 53 is kept driven. If the coolant temperature Tw is higher than the threshold value Tw_th, the controller 40 stops driving the engine heater 53 in step S106. To stop driving the engine heater 53, the controller 40 may stop supply of electric power to the engine heater 53.

The process shown in FIG. 5 may be performed in any of a time period before external charging is started, a time period after external charging is finished, and a time period during external charging. Also, the process shown in FIG. 5 may be performed, using at least two time periods, out of the three time periods. The time period in which the process shown in FIG. 5 is performed may be determined, in view of the fact that the coolant temperature Tw is reduced after execution of the process shown in FIG. 5.

A known process may be suitably employed as a process of external charging, which will not be described in detail. With the external charging thus performed, the SOC of the battery assembly 10 can be increased to a target value (SOC that is higher than the reference value SOC_ref).

According to the process shown in FIG. 5, the engine heater 53 is driven, so that the coolant temperature Tw is made higher than the threshold value Tw_th before the vehicle 100 starts traveling. Thus, when the vehicle 100 starts traveling, the engine 26 can be prevented from being started for the reason that the coolant temperature Tw is equal to or lower than the threshold value Tw_th.

The process shown in FIG. 5 is performed when external charging is conducted. At the end of external charging, the SOC of the battery assembly 10 is higher than the reference value SOC_ref, and the vehicle 100 can travel in the CD mode. If the coolant temperature Tw is equal to or lower than the threshold value Tw_th even though the vehicle 100 can travel in the CD mode, the engine 26 is started. By performing the process shown in FIG. 5, the vehicle 100 can start traveling in the CD mode, without starting the engine 26.

Even in the case where the engine 26 is heated with the block heater as described above, the coolant temperature Tw can be elevated to be higher than the threshold value Tw_th, before the vehicle 100 starts traveling.

In the process shown in FIG. 5, driving of the engine heater 53 is stopped when the coolant temperature Tw becomes higher than the threshold value Tw_th. However, the invention is not limited to this arrangement. For example, a temperature that is higher than the threshold value Tw_th may be set in advance, and driving of the engine heater 53 may be stopped when the coolant temperature Tw becomes higher than the set temperature.

Figure 6:
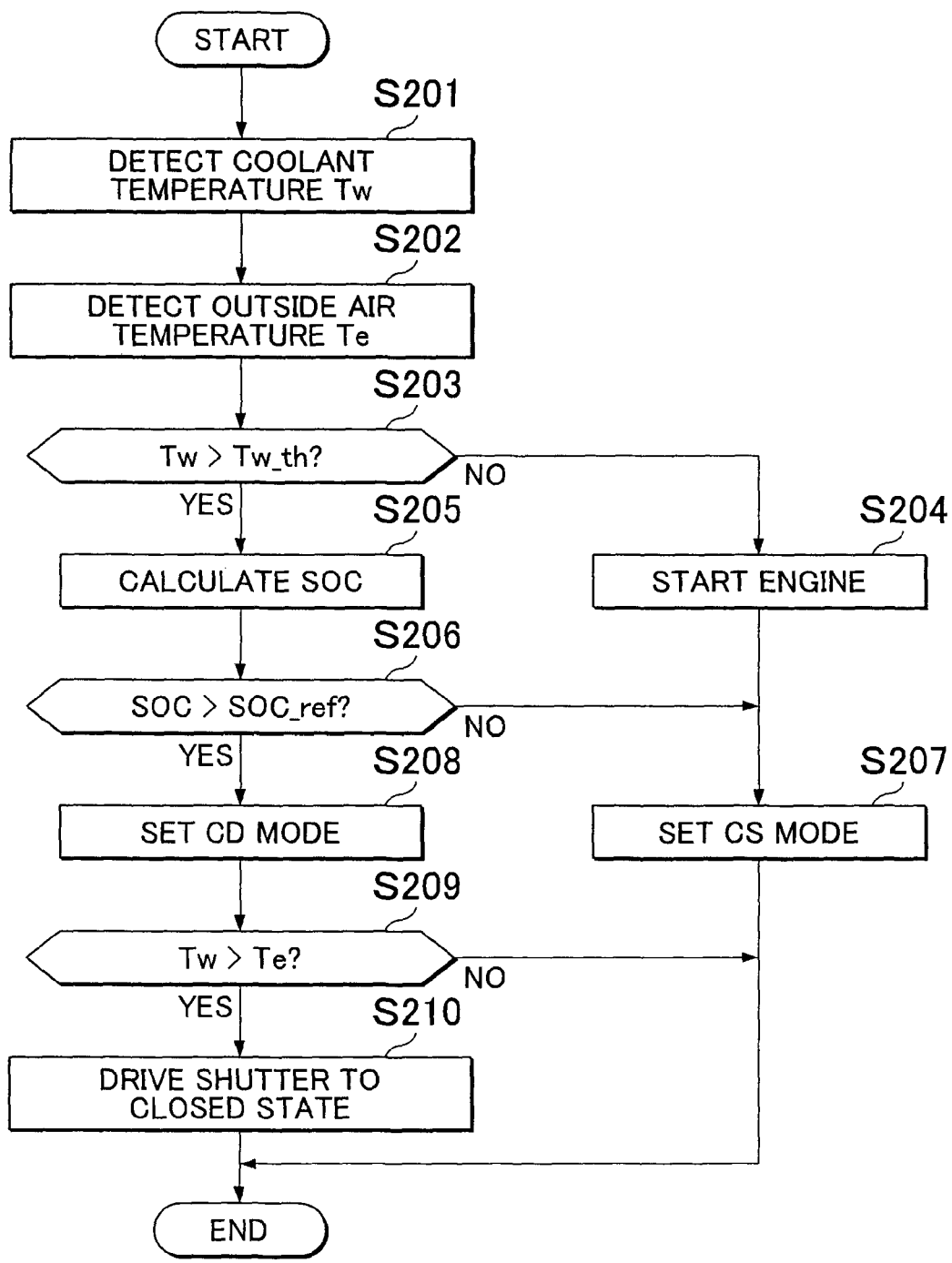
FIG. 6 is a flowchart illustrating control performed when a vehicle starts traveling, in a first embodiment of the invention.

Next, a process performed when the vehicle 100 starts traveling will be described, using the flowchart shown in FIG. 6. The process shown in FIG. 6 is carried out by the controller 40. Also, the process shown in FIG. 6 is started when the ignition switch is switched from OFF to ON.

In step S201, the controller 40 obtains the coolant temperature Tw, based on the output (detection result) of the coolant temperature sensor 51. In step S202, the controller 40 obtains the outside air temperature Te, based on the output (detection result) of the outside air temperature sensor 52.

In step S203, the controller 40 determines whether the coolant temperature Tw obtained in step S201 is higher than the threshold value Tw_th. If the coolant temperature Tw is equal to or lower than the threshold value Tw_th, the controller 40 determines that it needs to start the engine 26, and starts the engine 26 in step S204. On the other hand, if the coolant temperature Tw is higher than the threshold value Tw_th, the controller 40 determines that there is no need to start the engine 26, and executes step S205. In this connection, when the engine heater 53 is driven before the process shown in FIG. 6 is started, the coolant temperature Tw is likely to be higher than the threshold value Tw_th.

In step S205, the controller 40 calculates the SOC (State of Charge) of the battery assembly 10. As known in the art, the SOC of the battery assembly 10 can be calculated based on the voltage value Vb and the current value Ib. In step S206, the controller 40 determines whether the SOC calculated in step S205 is higher than the reference value SOC_ref. If the SOC is equal to or lower than the reference value SOC_ref, the controller 40 sets the CS mode in step S207. When the engine 26 is started in step S204, too, the CS mode is set in step S207. If the CS mode is set, the controller 40 finishes the process shown in FIG. 6.

If the SOC is higher than the reference value SOC_ref, the controller 40 sets the CD mode in step S208. In step S209, the controller 40 determines whether the coolant temperature Tw obtained in step S201 is higher than the outside air temperature Te obtained in step S202. If the coolant temperature Tw is equal to or lower than the outside air temperature Te, the controller 40 finishes the process shown in FIG. 6.

If the coolant temperature Tw is higher than the outside air temperature Te, the controller 40 drives the shutter 61 into the closed state in step S210. If the shutter 61 is in the open state when the process shown in FIG. 6 is started, the shutter 61 is switched from the open state to the closed state, through the operation of step S210. If, on the other hand, the shutter 61 is in the closed state when the process shown in FIG. 6 is started, the shutter 61 is kept in the closed state.

According to the process shown in FIG. 6, the shutter 61 is placed in the closed state when the vehicle 100 travels in the CD mode, so that the coolant temperature Tw is less likely to be reduced. If the shutter 61 is placed in the open state, the air is introduced into the engine room 110 through the front grille 62, during traveling in the CD mode. Since the outside air temperature Te is lower than the coolant temperature Tw, the coolant temperature Tw is reduced due to the air introduced into the engine room 110. In this connection, since the power supply of the engine heater 53 is the AC power supply 34, the engine heater 53 cannot generate heat during traveling in the CS mode so as to reduce the coolant temperature Tw.

When the outside air temperature Te is equal to or lower than the threshold value Tw_th, the coolant temperature Tw becomes equal to or lower than the threshold value Tw_th during traveling in the CD mode. Also, even if the outside air temperature Te is higher than the threshold value Tw_th, the coolant temperature Tw may become equal to or lower than the threshold value Tw_th, due to the air (or wind) flowing into the engine room 110 during traveling of the vehicle. If the coolant temperature Tw becomes equal to or lower than the threshold value Tw_th, the engine 26 may be started during traveling in the CD mode, and the vehicle 100 cannot be kept traveling in the CD mode. If the engine 26 is started due to reduction of the coolant temperature Tw even though the vehicle can travel in the CD mode, the user may feel uncomfortable or strange.

As described above, the shutter 61 is driven to the closed state, so as to curb reduction of the coolant temperature Tw. Thus, during traveling in the CD mode, the coolant temperature Tw is less likely to be equal to or lower than the threshold value Tw_th, and the engine 26 is less likely to be started. Namely, the vehicle 100 can be kept traveling in the CD mode, without starting the engine 26. Consequently, the user of the vehicle traveling in the CD mode can be prevented from feeling uncomfortable or strange as described above.

When the vehicle 100 starts traveling after being left standing, the coolant temperature Tw is normally equal to the outside air temperature Te. If the coolant temperature Tw is higher than the outside air temperature Te, it can be found that the coolant temperature Tw is elevated through heating of the engine 26 before the vehicle 100 starts traveling. If the engine 26 is heated, it can be found that the outside air temperature Te is reduced. At the thus reduced outside air temperature Te, the coolant temperature Tw is likely to be equal to or lower than the threshold value Tw_th during traveling in the CD mode. In view of this point, in this embodiment, the shutter 61 is driven to the closed state, when the coolant temperature Tw is higher than the outside air temperature Te.

In step S210 shown in FIG. 6, the shutter 61 may be driven to the closed state before the vehicle 100 actually starts traveling, or after the vehicle 100 actually starts traveling. If the shutter 61 is driven to the closed state before the vehicle 100 actually starts traveling, reduction of the coolant temperature Tw can be more easily curbed.

The engine 26 may be started during traveling in the CD mode, due to the required output (a traveling condition, such as WOT) of the vehicle 100, as described above, but not due to the influence of the coolant temperature Tw. This starting of the engine 26 is caused by the operation of the accelerator pedal, and is different from starting of the engine 26 due to reduction of the coolant temperature Tw. Therefore, even if the engine 26 starts during traveling in the CD mode, the user is less likely to feel uncomfortable or strange.

If the engine 26 is started based on the required output of the vehicle 100, the coolant temperature Tw can be raised. If the shutter 61 is placed in the closed state, based on the process shown in FIG. 6, reduction of the coolant temperature Tw can be curbed after the engine 26 is started and stopped.

Next, a second embodiment of the invention will be described. In this embodiment, what has been explained in the first embodiment will not be explained. Only the points different from those of the first embodiment will be mainly explained.

When charge and discharge of the battery assembly 10 are controlled, a discharged power permissible value Wout_max and a charging power permissible value Win_max are set. Since the current value Ib during discharging takes a positive value, the discharged power permissible value Wout_max is a positive value. Also, since the current value Ib during charging takes a negative value, the charging power permissible value Win_max is a negative value.

The discharged power permissible value Wout_max is an upper-limit electric power value up to which discharging of the battery assembly 10 can be permitted. When the battery assembly 10 is discharged, discharging is controlled so that the discharged power value does not become higher than the discharged power permissible value Wout_max. The charging power permissible value (absolute value) Win_max is the upper-limit electric power value up to which charging of the battery assembly 10 can be permitted. When the battery assembly 10 is charged, charging is controlled so that the charging power value (absolute value) does not become higher than the charging power permissible value (absolute value) Win_max.

As known in the art, the discharged power permissible value Wout_max and the charging power permissible value Win_max are set based on the SOC and battery temperature Tb of the battery assembly 10. In the following, a method of setting the discharged power permissible value Wout_max and the charging power permissible value Win_max, based on the battery temperature Tb, will be described.

Figure 7:
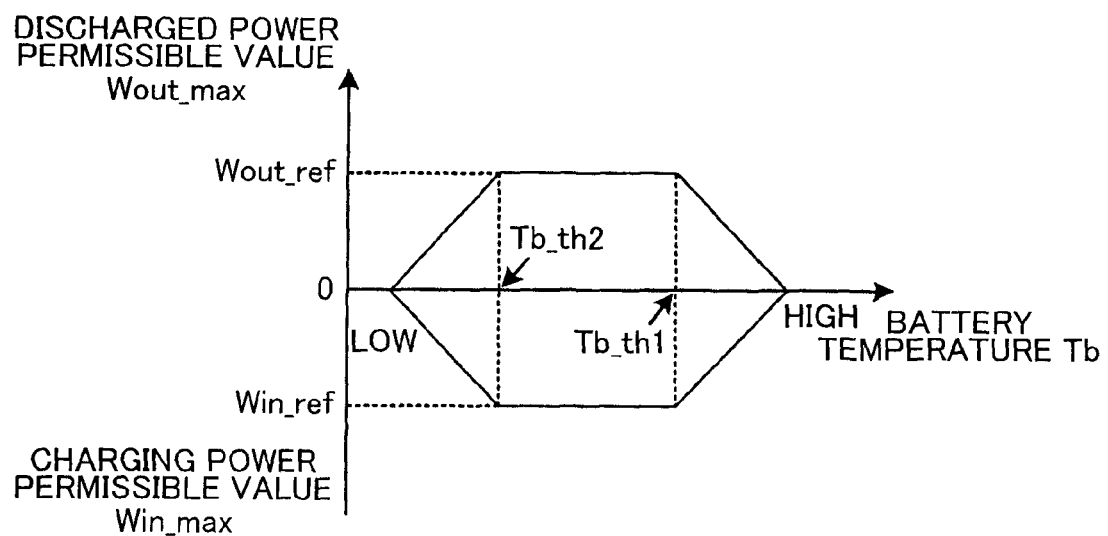
FIG. 7 is a view showing the relationship of a discharged power permissible value, charging power permissible value, and a battery temperature.

FIG. 7 indicates the correspondence relationship between the battery temperature Tb and the discharged power permissible value Wout_max, and the correspondence relationship between the battery temperature Tb and the charging power permissible value Win_max. In FIG. 7, the vertical axis indicates the discharged power permissible value Wout_max and the charging power permissible value Win_max, and the horizontal axis indicates the battery temperature Tb. On the horizontal axis of FIG. 7, the battery temperature Tb becomes higher from the left side to the right side thereof.

When the battery temperature Tb is equal to or lower than a first threshold value Tb_th1, and is equal to or higher than a second threshold value Tb_th2, the discharged power permissible value Wout_max is equal to a reference electric power value (positive fixed value) Wout_ref, irrespective of the battery temperature Tb. The first threshold value (corresponding to the upper-limit temperature of the invention) Tb_th is higher than the second threshold value (corresponding to the lower-limit temperature of the invention) Tb_th2. The first threshold value Tb_th1 and the second threshold value Tb_th2 are set based on output characteristics of the battery assembly 10.

When the battery temperature Tb is higher than the first threshold value Tb_th1, the discharged power permissible value Wout_max is lower than the reference electric power value Wout_ref. The discharged power permissible value Wout_max decreases as the battery temperature Tb becomes higher. On the other hand, when the battery temperature Tb is lower than the second threshold value Tb_th2, the discharged power permissible value Wout_max is lower than the reference electric power value Wout_ref. The discharged power permissible value Wout_max decreases as the battery temperature Tb becomes lower. When the discharged power permissible value Wout_max is equal to 0 [kW], the battery assembly 10 discharges no electric power.

When the battery temperature Tb is equal to or lower than the first threshold value Tb_th1, and is equal to or higher than the second threshold value Tb_th2, the charging power permissible value Win_max is equal to a reference electric power value (negative value) Win_ref, irrespective of battery temperature Tb. The first threshold value Tb_th1 and the second threshold value Tb_th2 are set based on the input characteristics of the battery assembly 10. When the battery temperature Tb is higher than the first threshold value Tb_th1, the charging power permissible value Win_max is higher than the reference electric power value Win_ref. The charging power permissible value Win_max increases as the battery temperature Tb becomes higher. In other words, the absolute value of the charging power permissible value Win_max is reduced as the battery temperature Tb becomes higher.

When the battery temperature Tb is lower than the second threshold value Tb_th2, the charging power permissible value Win_max is higher than the reference electric power value Win_ref. The charging power permissible value Win_max increases as the battery temperature Tb becomes lower. In other words, the absolute value of the charging power permissible value Win_max is reduced as the battery temperature Tb becomes lower. When the charging power permissible value Win_max is equal to 0 [kW], the battery assembly 10 is not charged.

In the example shown in FIG. 7, the battery temperatures Tb (the first threshold value Tb_th1, the second threshold value Tb_th2) at which the discharged power permissible value Wout_max starts being reduced to be smaller than the reference electric power value Wout_ref are equal to the battery temperatures Tb (the first threshold value Tb_th1, the second threshold value Tb_th2) at which the charging power permissible value (the absolute value) Win_max starts being reduced to be smaller than the reference electric power value (the absolute value) Win_ref. However, the invention is not limited to this example. Namely, regarding at least one of the first threshold value Tb_th1 and the second threshold value Tb_th2, the battery temperature Tb at which the discharged power permissible value Wout_max starts being reduced may be different from the battery temperature Tb at which the charging power permissible value (the absolute value) Win_max starts being reduced.

On the other hand, in the example as shown in FIG. 7, the battery temperatures Tb at which the discharged power permissible value Wout_max becomes equal to 0 [kW] are equal to the battery temperatures Tb at which the charging power permissible value Win_max becomes equal to 0

[kW], However, the former battery temperatures Tb may be different from the latter battery temperatures Tb.

Figure 8:
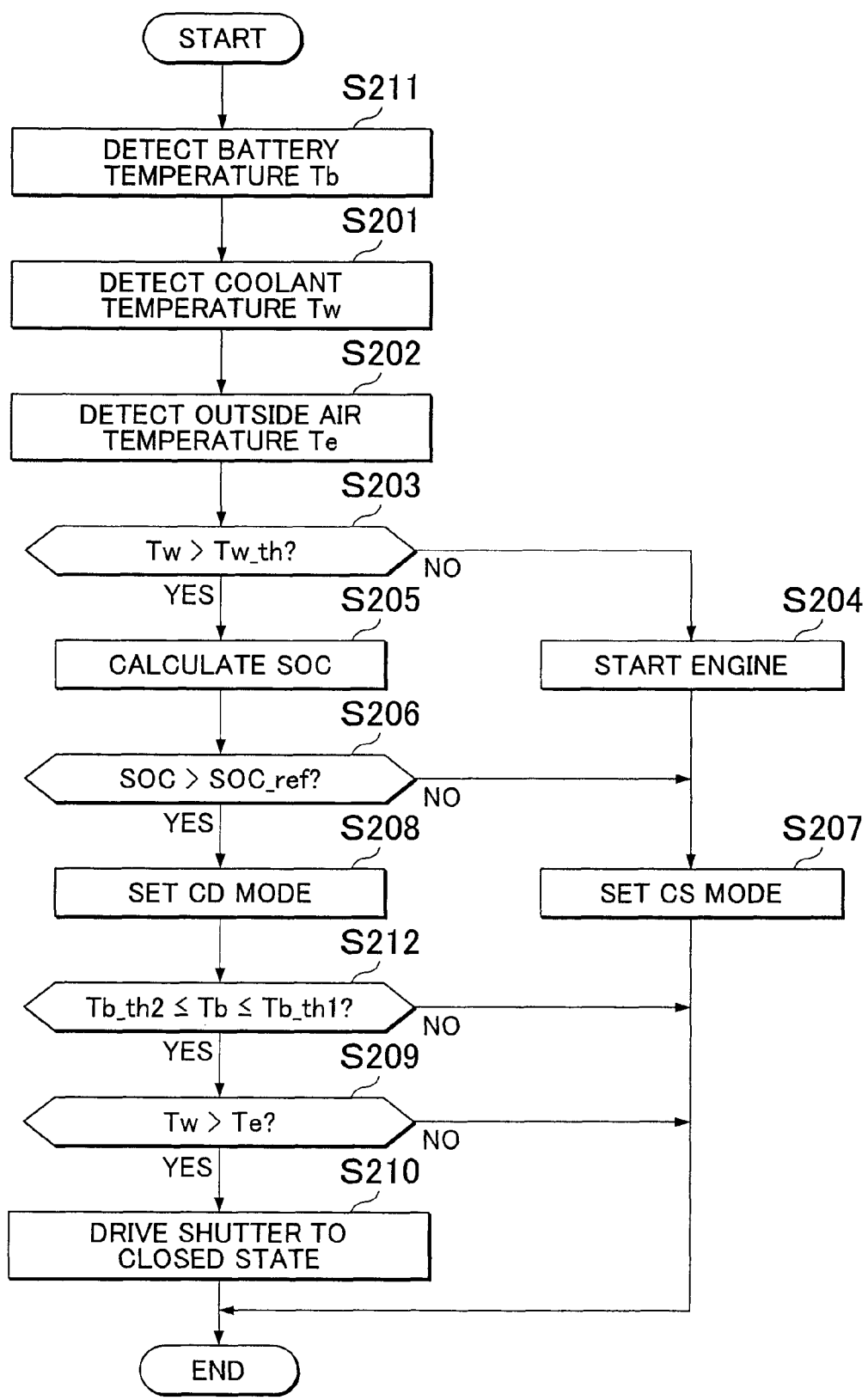
FIG. 8 is a flowchart illustrating control performed when the vehicle starts traveling, in a second embodiment of the invention.

Next, a process performed when the vehicle 100 starts traveling will be described using the flowchart shown in FIG. 8. The process shown in FIG. 8 corresponds to the process shown in FIG. 6. Thus, the same step numbers are used for the same steps as those explained above in FIG. 6, and these steps will not be described in detail.

In step S211, the controller 40 obtains the battery temperature Tb, based on the output (detection result) of the battery temperature sensor 21. After step S211 is executed, step S201 and subsequent steps are executed. After step S208 is executed, step S212 is executed. The operation of step S211 is only required to be performed before step S212 is executed.

In step S212, the controller 40 determines whether the battery temperature Tb obtained in step S211 is equal to or higher than the second threshold value Tb_th2 and is equal to or lower than the first threshold value Tb_th1 . If the battery temperature Tb is equal to or higher than the second threshold value Tb_th2 and is equal to or lower than the first threshold value Tb_th1 , the controller 40 performs the operation of step S209. On the other hand, if the battery temperature Tb is lower than the second threshold value Tb_th2, or the battery temperature Tb is higher than the first threshold value Tb_th1 , the controller 40 finishes the process shown in FIG. 8.

According to this embodiment, when the battery temperature Tb is equal to or higher than the second threshold value Tb_and is equal to or lower than the first threshold value Tb_th1 , and the coolant temperature Tw is higher than the outside air temperature Te, the shutter 61 is driven to the closed state. If the battery temperature Tb is equal to or higher than the second threshold value Tb_th2 and is equal to or lower than the first threshold value Tb_th1 , the discharged power permissible value Wout_max is set to the reference electric power value Wout_ref, and the battery assembly 10 can discharge electric power without lowing the discharged power permissible value Wout_max.

Thus, the discharged power (output) of the battery assembly 10 can provide the required output of the vehicle 100, which makes it easy for the vehicle 100 to keep traveling in the CD mode. In order to maintain this condition, it is preferable to drive the shutter 61 to the closed state, and curb reduction of the coolant temperature Tw.

On the other hand, if the discharged power permissible value Wout_max is reduced to be lower than the reference electric power value Wout_ref, the required output of the vehicle 100 is less likely to be provided or covered by the discharged power (output) of the battery assembly 10, and the engine 26 may be started. If the engine 26 is started, it is not necessary to drive the shutter 61 to the closed state, and curb reduction of the coolant temperature Tw. Thus, in this embodiment, the shutter 61 is driven to the closed state, in view of the battery temperature Tb, as well as the outside air temperature Te being higher than the coolant temperature Tw.

As described above, the discharged power permissible value Wout_max depends not only on the battery temperature Tb, but also on the SOC of the battery assembly 10. As known in the art, if the SOC of the battery assembly 10 is reduced, the discharged power permissible value Wout_max is reduced to be lower than the reference electric power value Wout_ref. However, when the vehicle 100 travels in the CD mode, the SOC of the battery assembly 10 is higher than the reference value SOC_ref, and therefore, the discharged power permissible value Wout_max is not likely to be lower than the reference electric power value Wout_ref. Thus, as in this embodiment, when driving of the shutter 61 is controlled in view of the discharged power (output) of the battery assembly 10, the SOC of the battery assembly 10 need not be taken into consideration, but only the battery temperature Tb may be taken into consideration.

If there is a possibility that the battery temperature Tb is reduced to be lower than the second threshold value Tb_th2 when the vehicle 100 starts traveling, the battery assembly 10 may be heated before the vehicle 100 starts traveling. In this manner, the battery temperature Tb may be made equal to or higher than the second threshold value Tb_th2, when the vehicle 100 starts traveling.

In this embodiment, an environment in which the temperature Te of the outside air is reduced is assumed, as described above. Therefore, the battery temperature Tb may be reduced to be lower than the second threshold value Tb_th2. Thus, it is preferable to heat the battery assembly 10, so as to make the battery temperature Tb equal to or higher than the second threshold value Tb_th2. When the environment in which the outside air temperature Te is reduced is assumed, the battery temperature Tb is not likely to be higher than the first threshold value Tb_th1 . Thus, in step S212 shown in FIG. 8, it may be only determined whether the battery temperature Tb is equal to or higher than the second threshold value Tb_th2. If the battery temperature Tb is equal to or higher than the second threshold value Tb_th2, step S209 can be executed. If, on the other hand, the battery temperature Tb is lower than the second threshold value Tb_th2, the process shown in FIG. 8 may be finished.

A battery heater may be used as a means for heating the battery assembly 10. The battery heater may employ a known arrangement as appropriate, provided that it can heat the battery assembly 10. For example, a device or element that generates heat when energized may be used, or a device or equipment that generates heat using the principle of a heat pump may be used.

Figure 9:
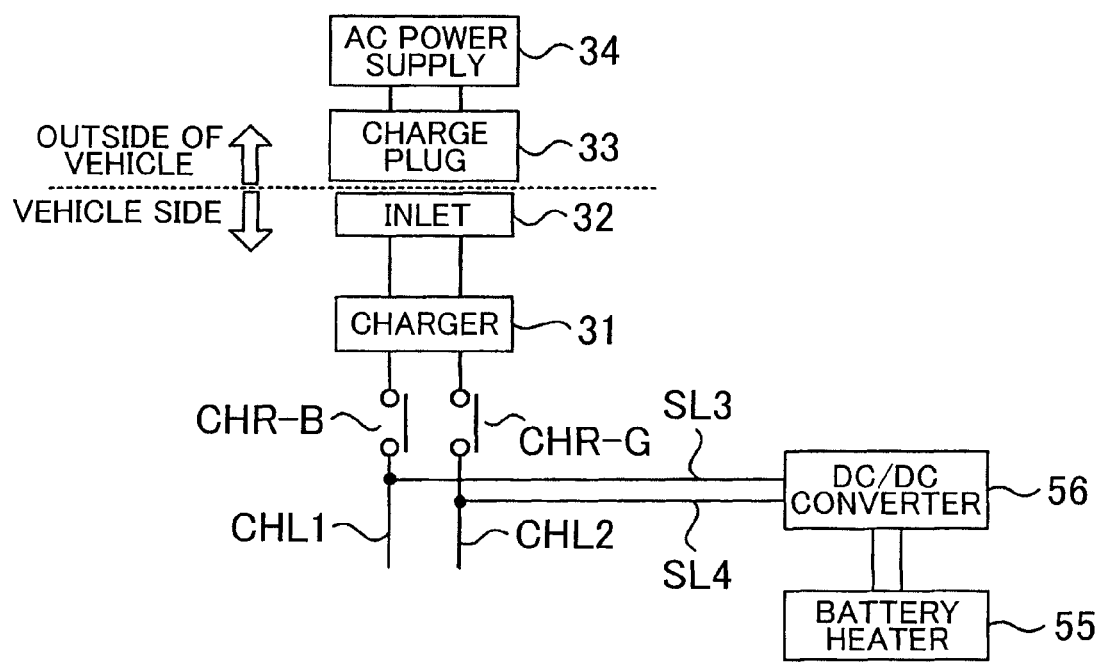
FIG. 9 is a view showing the arrangement of driving a battery heater.

An external power supply (such as the AC power supply 34) is used as a power supply of the battery heater. More specifically, as shown in FIG. 9, the battery heater 55 and a DC/DC converter 56 may be connected to the charge lines CHL1, CHL2, via power supply lines SL3, SL4. In FIG. 9, the configuration of a part of the battery system shown in FIG. 1 is also illustrated. The power supply line SL3 is connected to the charge line CHL1 that connects the charge relay CHR-B and the positive line PL. The power supply line SL4 is connected to the charge line CHL2 that connects the charge relay CHR-G and the negative line NL.

In the arrangement shown in FIG. 9, when external charging is conducted, electric power is supplied from the AC power supply 34 to the battery heater 55, so that the battery heater 55 generates heat, whereby the battery assembly 10 can be heated. The electric power whose voltage has been converted by the DC/DC converter 56 can be supplied to the battery heater 55.

While driving of the shutter 61 is not controlled except when the operation of step S210 is performed in the first and second embodiments, the invention is not limited to this arrangement. Namely, driving of the shutter 61 may be controlled even when the operation of step S210 is not performed. For example, lift force or downforce may be generated, according to the drive status of the shutter 61, and driving of the shutter 61 may be controlled so as to assure stable traveling of the vehicle 100.

While the shutter 61 is driven only between the closed state and the open state in the first and second embodiments, the invention is not limited to this arrangement. Namely, the drive status of the shutter 61 may be set in a stepwise fashion, between the closed state and the open state. More specifically, in FIG. 3, the rotational angle of the closure plate 61b may be changed in a stepwise fashion. With this arrangement, the amount of the air passing through the opening A of the shutter 61 and introduced into the engine room 110 may be changed in a stepwise fashion. The temperature Tw of the coolant is less likely to be reduced as the amount of the air introduced into the engine room 110 is reduced.

If the drive status of the shutter 61 can be set in a stepwise fashion, the shutter 61 need not be moved to the closed state in step S210. In this connection, the amount of the air passing through the shutter 61 when step S210 is executed is only required to be smaller than the amount of the air passing through the shutter 61 when step S210 is not executed. Namely, in step S210, the shutter 61 is only required to be driven so that the amount of the air introduced into the engine room 110 is reduced. More specifically, the rotational angle of the closure plate 61b when step S210 is executed is only required to be closer to the rotational angle (see FIG. 3) in the closed state, than the rotational angle of the closure plate 61b when step S210 is not executed.

While the traveling mode of the vehicle 100 is switched between the CD mode and the CS mode in the first and second embodiments, the invention is not limited to this arrangement. More specifically, the traveling mode of the vehicle 100 may be switched between an EV (Electric Vehicle) mode and an HV (Hybrid Vehicle) mode. In the EV mode (corresponding to the first mode of the invention), the vehicle 100 travels only through charge/discharge of the battery assembly 10. The EV mode in which the engine 26 is not started is distinguished from the CD mode in which the engine 26 may be started. On the other hand, the HV mode (corresponding to the second mode of the invention) is the same as the CS mode in that the SOC of the battery assembly 10 is varied within a predetermined range ΔSOC. Like switching between the CD mode and CS mode, the traveling mode of the vehicle 100 may be switched between the EV mode and the HV mode, according to the SOC of the battery assembly 10.

As in the first embodiment, when the coolant temperature Tw is higher than the threshold value Tw_th, and the vehicle travels in the EV mode, the shutter 61 may be driven to the closed state if the coolant temperature Tw is higher than the outside air temperature Te. Also, as in the second embodiment, when the coolant temperature Tw is higher than the outside air temperature Te, and the battery temperature Tb is equal to or higher than the second threshold value Tb_th2 and is equal to or lower than the first threshold value Tb_th1, the shutter 61 may be driven to the closed state.

The invention claimed is:

1. A vehicle comprising:
an engine that is a first power source of the vehicle;
a power storage device that is a second power source of the vehicle, the power storage device being adapted to be charged and discharged;
a front grille;
an engine room in which the engine is housed;
a shutter configured to change an amount of air introduced from the front grille into the engine room;
a controller configured to control driving of the shutter;
a first temperature sensor configured to detect a first temperature, and output the detected first temperature to the controller, the first temperature being a temperature of a coolant of the engine; and
a second temperature sensor configured to detect a second temperature, and output the detected second temperature to the controller, the second temperature being a temperature of outside air, wherein:
the controller is configured to travel the vehicle in a selected one of a first mode and a second mode, the first mode being a mode in which the vehicle travels using the power storage device when a state of charge of the power storage device is higher than a reference value, the second mode being a mode in which the vehicle travels using the engine and the power storage device when the state of charge is equal to or lower than the reference value, such that the state of charge of the power storage device is varied within a predetermined range that is equal to or lower than the reference value;
the controller is configured to determine whether the first temperature is equal to or lower than a threshold value;
the controller is configured to start the engine when the first temperature is equal to or lower than the threshold value;
the controller is configured to determine whether the vehicle is in the first mode and to determine whether the first temperature is higher than the second temperature; and
the controller is configured to drive the shutter such that the amount of the air is reduced, when the first temperature is higher than the threshold value, the vehicle starts traveling in the first mode, and the first temperature is higher than the second temperature.

2. The vehicle according to claim 1, further comprising a third temperature sensor configured to detect a third temperature, and output the third temperature to the controller, the third temperature being a temperature of the power storage device, wherein:
when the temperature of the power storage device is lower than a lower-limit temperature and the temperature of the power storage device is higher than an upper-limit temperature, an upper-limit electric power value up to which discharge of the power storage device is permitted is reduced to be lower than a reference electric power value; and
the controller is configured to drive the shutter such that the amount of the air is reduced, when the third temperature is equal to or higher than the lower-limit temperature and is equal to or lower than the upper-limit temperature and the first temperature is higher than the second temperature.

3. The vehicle according to claim 1, wherein the controller is configured to drive the shutter such that the amount of the air is reduced to an amount that is lower than the amount of the air introduced when the first temperature is higher than the threshold value.

4. The vehicle according to claim 1, wherein the controller is configured to drive the shutter such that the amount of the air is reduced to an amount that is lower than the amount of the air introduced when the vehicle travels in the second mode.

5. The vehicle according to claim 1, wherein the controller is configured to drive the shutter such that the amount of the air is reduced to an amount that is lower than the amount of the air introduced when the first temperature is equal to or lower than the second temperature.

6. The vehicle according to claim 1, wherein:
the air is introduced from the front grille into the engine room when the shutter is in an open state, and the air is inhibited from moving from the front grille into the engine room when the shutter is in a closed state; and the controller is configured to reduce the amount of the air by placing the shutter in the closed state.

7. A vehicle comprising:

a plurality of power sources including an engine and a power storage device;

a front grille;

an engine room in which the engine is housed;

a shutter configured to change an amount of air introduced from the front grille into the engine room;

a first temperature sensor configured to detect a first temperature, the first temperature being a temperature of a coolant of the engine;

a second temperature sensor configured to detect a second temperature, the second temperature being a temperature of outside air; and a controller configured to:

(a) start the engine when the first temperature is equal to or lower than a threshold value; and (b) drive the shutter when the first temperature is higher than the threshold value and the vehicle travels with power of the power storage device, such that the amount of the air introduced when the first temperature is higher than the second temperature is reduced to be lower than the amount of the air introduced when the first temperature is equal to or lower than the second temperature.

8. A method of controlling a vehicle, the vehicle including a plurality of power sources, a front grille, an engine room, a shutter, a first temperature sensor, a second temperature sensor, and a controller, the plurality of power sources including an engine and a power storage device, the engine being housed in the engine room, the shutter being configured to change an amount of air introduced from the front grille into the engine room, the first temperature sensor being configured to detect a first temperature, the first temperature being a temperature of a coolant of the engine, the second temperature sensor being configured to detect a second temperature, the second temperature being a temperature of outside air, the method comprising:

(a) starting the engine, by the controller, when the first temperature is equal to or lower than a threshold value; and (b) driving the shutter, by the controller, when the first temperature is higher than the threshold value and the vehicle travels with power of the power storage device, such that the amount of the air introduced when the first temperature is higher than the second temperature is reduced to be lower than the amount of the air introduced when the first temperature is equal to or lower than the second temperature.

* * * * *